United States Patent
Staufer et al.

(10) Patent No.: US 10,900,823 B2
(45) Date of Patent: Jan. 26, 2021

(54) METHOD FOR MEASURING MASS DISTRIBUTION

(71) Applicant: König Maschinen Gesellschaft m.b.H, Graz (AT)

(72) Inventors: Wolfgang Staufer, Vienna (AT); Josef Hefner, Dürrwangen (DE); Johann Thormählen, Kollmar (DE); Dieter Sönnichsen, Burg (DE); Hannes Stelzer, Lannach (AT); Gernot Maier, Hart bei Graz (AT)

(73) Assignee: König Maschinen Gesellschaft m.b.H., Graz (AT)

( * ) Notice: Subject to any disclaimer, the term of this patent is extended or adjusted under 35 U.S.C. 154(b) by 54 days.

(21) Appl. No.: 16/087,913

(22) PCT Filed: Mar. 23, 2017

(86) PCT No.: PCT/AT2017/060074
§ 371 (c)(1),
(2) Date: Sep. 24, 2018

(87) PCT Pub. No.: WO2017/161399
PCT Pub. Date: Sep. 28, 2017

(65) Prior Publication Data
US 2019/0107432 A1    Apr. 11, 2019

(30) Foreign Application Priority Data

Mar. 24, 2016 (AT) .................. A 157/2016
Mar. 24, 2016 (AT) .................. A 158/2016
Jun. 17, 2016 (AT) .............. A 50553/2016

(51) Int. Cl.
*A21C 5/00*     (2006.01)
*E04B 1/26*     (2006.01)
(Continued)

(52) U.S. Cl.
CPC ............... *G01G 11/04* (2013.01); *A21C 3/02* (2013.01); *A21C 5/00* (2013.01); *E04B 1/2604* (2013.01);
(Continued)

(58) Field of Classification Search
CPC .. A21C 5/00; A21C 3/02; G01G 11/04; E04B 1/2604; E04B 2001/2644; E04B 2001/2652
(Continued)

(56) References Cited

U.S. PATENT DOCUMENTS 3,850,023 A    11/1974   McDonald
4,526,244 A    7/1985    Chauveau
(Continued)

FOREIGN PATENT DOCUMENTS

DE    010136980    *   9/2002
DE    10136980 A1      9/2002
(Continued)

OTHER PUBLICATIONS

International Search Report and Translation Application No. PCT/AT2017/060074 Completed: May 11, 2017; dated May 19, 2017 7 pages.
(Continued)

*Primary Examiner* — Jacques M Saint Surin
(74) *Attorney, Agent, or Firm* — Whitmyer IP Group LLC

(57) ABSTRACT

A method for measuring the mass distribution along the width of a strip, in particular a dough strip, moved in the longitudinal direction of the strip and having a specified target width. At least two weighing cells are arranged at a distance to each other with respect to the width of the strip. The weight of at least one dough strand or dough piece having a width defined by the distances of the weighing cells is sensed. The mass of the partial pieces of the strip is
(Continued)

determined on the basis of the distance of the weighing cells to each other, the position of the weighing cells along the width of the strip, the strip speed, and the measured values of the weight of the partial pieces sensed by the weighing cells, in particular over a defined time period.

18 Claims, 2 Drawing Sheets

(51) Int. Cl.
*A21C 3/02* (2006.01)
*G01G 11/04* (2006.01)

(52) U.S. Cl.
CPC ............... *E04B 2001/2644* (2013.01); *E04B 2001/2652* (2013.01)

(58) Field of Classification Search
USPC .............................................. 177/1
See application file for complete search history.

(56) References Cited

U.S. PATENT DOCUMENTS

| | | | |
|---|---|---|---|
| 4,808,818 A | * | 2/1989 | Jung ................... H01J 49/025 250/252.1 |
| 4,975,578 A | * | 12/1990 | Tomimasu ............ G01N 23/04 250/307 |
| 2014/0034448 A1 | | 2/2014 | van Blokland |

FOREIGN PATENT DOCUMENTS

| | | | |
|---|---|---|---|
| EP | 1884162 | * | 2/2008 |
| EP | 2607050 | * | 6/2013 |
| EP | 2846140 A1 | | 3/2015 |

OTHER PUBLICATIONS

Written Opinion of the International Searching Authority Application No. PCT/AT2017/060074 Completed: May 11, 2017 6 pages.

* cited by examiner

METHOD FOR MEASURING MASS DISTRIBUTION

TECHNICAL FIELD

The present teaching relates to a method for measuring the mass distribution along the width of a strip moved along its longitudinal direction, in particular a dough strip. In addition the present teaching relates to a weighing apparatus to measure the mass distribution along the width of a strip moved along its longitudinal direction, in particular of a dough strip.

BACKGROUND

In the prior art, dough strips in dough strip installations are adjusted to a specified dough thickness by means of calibrating rollers or other rollers. Particular attention is taken to ensure that the calibrating rollers or other rollers are at the same distance from one another in order to achieve homogeneous thickness of the dough strip. In addition, in the prior art, the weight of dough pieces already cut is recorded by means of weighing units and underweight dough pieces are removed, because underweight dough pieces may not be sold. On the basis of the measured weight of the completed dough pieces, the cutting device is then readjusted in order to minimize rejects.

A disadvantage of the previous weighing apparatuses and methods is that irregularities in the thickness and weight of the dough, for example too high or too low a weight, cannot be reported. Thus, a number of dough pieces are always produced erroneously, even before readjustment can occur within a dough strip installation, cutting devices or roller apparatuses. Excessive weight of dough pieces is likewise a disadvantage, because although they can be sold, the irregularity causes a waste of dough and thus a cost increase.

It is therefore an object of the present teaching to reduce rejects at dough strip installations.

SUMMARY

This object is achieved in one embodiment by means of at least two weighing cells, which are disposed at a distance from one another with respect to the width of the strip, the weight of at least two defined partial pieces with a width defined by the distances of the weighing cells is recorded, wherein the mass of the partial pieces of the strip is ascertained, in particular over a defined period of time, taking into account the distance of the weighing cells to one another, the position of the weighing cells along the width of the strip, the strip speed and the measured values of the weight of the partial pieces obtained by the weighing cells.

By measuring and recording the mass distribution of the dough strand or dough strip, errors and discrepancies in mass, density and/or weight can be ascertained at one or more parts of the dough strip. Thus, even before a cutting procedure or further processing of the dough, irregularities in the dough can be ascertained. In addition, as a countermeasure, with an adjustable roller, for example a one-sided thickness adjustment or tilting of the rollers can then be specified in order to counteract a general difference in thickness or in density and thus discrepancies in weight.

It is a further object of the present teaching to provide a weighing apparatus with the aid of which any rejects in production of dough pieces and dough strips can be reduced.

This object is fulfilled in one embodiment by a weighing apparatus that comprises at least two weighing cells, wherein the weighing cells are configured to determine the weight of a partial piece of a strip, in particular a dough strip, laid out on the transport belt, wherein the weighing cells are disposed at a distance from one another with respect to the width of the strip, and wherein the weighing apparatus comprises an evaluating unit with which the mass distribution in the strip, in particular the dough strip, can be ascertained while taking into account the measured values recorded by the weighing cells. A partial piece is understood hereinafter to mean a defined part of a dough strip with defined width and/or length.

With the help of the weighing apparatus, it is possible to ascertain the mass distribution of the dough strand or dough strip, and any possible errors and discrepancies in mass, density and/or weight at one or more parts of the dough strand or dough strip. As a result, corrections can be made even before the further processing of the dough. Thus, for example in the cutting process, a future cutting mass can be ascertained, which corresponds most closely to the desired weight.

Particularly advantageous embodiments of the method and of the weighing apparatus are defined in greater detail by the features in the dependent claims.

Additional improvement in recording a modification of the mass distribution within a partial piece and/or along the width of a strip can occur if the measuring values of the weighing cells are integrated over a defined period of time.

The mass flow of the strip or partial strip can advantageously be ascertained if a mass flow is determined, in particular by integration of the measuring values received from the weighing cells, on the basis of the strip speed of the strip moved over the weighing cells and the masses running over the weighing cells.

For better reporting of the discrepancy of the mass distribution, it is foreseen that the respective mass of the partial pieces is compared among them or with a reference value and thus discrepancies in weight of the partial pieces with respect to one another or to a reference value are ascertained along the width of the strip.

Control and regulation within a dough strip installation can occur advantageously if, on the basis of the recorded measuring values and/or mass of the partial pieces, the cutting width of a cutting unit, in particular following the weighing cells, in particular a longitudinal cutting unit, is specified in such a way that the continuous partial strips cut by the cutting device along the longitudinal direction of the strip comprise equal mass per longitudinal unit of the dough strip and/or there is a modification in the adjustment of rollers, in particular following the weighing cells and to which the strip, in particular the dough strip, is fed.

It is advantageously foreseen that, on the basis of the recorded measuring values and/or mass of the partial pieces and on the basis of the strip speed of the strip moved over the weighing cells and of the masses moving over the weighing cells, a mass flow is determined, in particular by integration of measuring values received from the weighing cells, and that the mass flow is adjusted or modified by compressing the strip and/or modifying the strip speed after the weighing apparatus, by modifying the transport speed of transport strips or the rotating speed of calibrating rollers, in particular within a dough strip installation.

To be able to ascertain the tension of the strip or dough strip and to better recognize discrepancies and related irregularities in the strip, it can be foreseen that the weighing cells and/or transport rolls or glide layers connected with the weighing cells extend beyond the transport level of the strip, in particular dough strip, wherein the strip, in particular the dough strip, is fed in a specified area over the weighing cells and/or transport rollers and/or glide layers in such a way that the strip, in particular the dough strip, surrounds, at least partially, the weighing cells and/or transport rollers and/or glide layers and wherein the tension within the strip, in particular the dough strip, is ascertained on the basis of the modification of the recorded measuring values.

A simultaneous measuring of the mass of several partial pieces occurs advantageously in that the weighing cells in the transverse direction, in particular in the end area, are disposed to follow the running direction of the transport strip, in particular flush with one another.

Transport of the strip can advantageously proceed undisturbed despite ascertaining the mass distribution, if the weighing cells are connected with transport rollers, preferably with their axles, and/or with glide layers in such a way that a strip, moved by means of the transport strip along its longitudinal direction, is mounted on the transport rollers and/or glide layers and can be moved away and that they are impacted by a defined part of the weight of the dough strip. Because of the use of transport rollers or glide layers, which are disposed at a close distance from one another over the entire width of the dough strip, the weight of the dough strip is uniformly distributed over the entire width of the dough strip and allows an evaluation virtually free of transverse force, so that no modification of the dough or dough strip occurs in transport over the weighing apparatus.

It is advantageously foreseen that the weighing cells are configured as shear force weighing cells, bending arm weighing cells, shear beam weighing cells or traction weighing cells.

An advantageous arrangement of the weighing cells is achieved if the weighing cells are each connected on one side to a frame of the weighing apparatus and in particular the opposite side of the weighing cell is connected with the transport rollers and/or glide layers, in such a way that the weight of a partial piece of the strip is ascertained by the respective weighing cells during transport of a strip over the transport rollers.

An advantageous width of the measured partial pieces, with simultaneous narrow design of the weighing apparatus, foresees that the weighing apparatus comprises 16 or 32 or 64 weighing cells, wherein in particular the weighing cells are distributed uniformly along the width of the transport strip over an entire distance of 800 mm. Likewise, such a number of weighing cells can be evaluated easily by a combination of several standard bus systems. An advantage of the great number of weighing cells disposed at a short distance from one another, is that, as a result, a high resolution of the mass distribution in the dough strip can be recorded. In addition, accordingly, in evaluating the measuring values in one or more industry PCs, resolution in the millisecond range can occur and thus precision can be increased.

Transfer of a strip to additional stations and trouble-free transport of a strip can be improved if the weighing apparatus comprises two transport strips, which are disposed one behind the other in the transport direction of the strip, wherein the weighing cells, in particular the transport rollers and/or glide layer, are disposed between the two transport strips in such a way that, on turning over a strip lying on the transport strips from one transport strip to the other transport strip, the weighing cells, in particular the transport rollers and/or glide layer, are impacted by the weight of the strip, wherein each weighing cell is impacted with the weight of a partial piece of the strip.

An advantageous use of the weighing apparatus foresees that a dough strip installation comprises an inventive weighing apparatus, wherein preferably the weighing apparatus is placed ahead of a cutting installation, in particular a longitudinal cutting unit, and/or one or more movable rollers, wherein the dough strip installation or the weighing apparatus comprises a control unit with which the cutting width of the cutting unit, in particular the longitudinal cutting unit, is specified in such a way, while taking into account the ascertained weight distribution along the width of the strip, that the continuous partial strips cut by the cutting device along the longitudinal direction of the strip comprise equal mass per longitudinal unit of the partial band and/or that the adjustment of the rollers by the control unit, taking into account the ascertained weight distribution along the width of the strip, is variable and/or that at least one transport strip or at least one calibrating roller is placed before and/or after the weighing apparatus, wherein, on the basis of the mass flow ascertained by the weighing apparatus, the transport speed of the transport strip or the rotating speed of the calibrating roller, the mass flow can be adjusted or modified by compressing the dough strip and/or modifying the strip speed.

By regulating several units within the dough strip installation with respect to one another, corrective steps can be prevented and the loss of dough can be reduced, while weight exact production of doughs, dough strips and dough pieces can be achieved.

Further advantages and embodiments of the present teaching can be seen from the description and the appended drawings.

The present teaching is presented schematically hereinafter in the drawings, on the basis of particularly advantageous embodiments, which however are not to be understood as restrictive, and is described with reference to the drawings by way of example.

DETAILED DESCRIPTION

Figure 1:
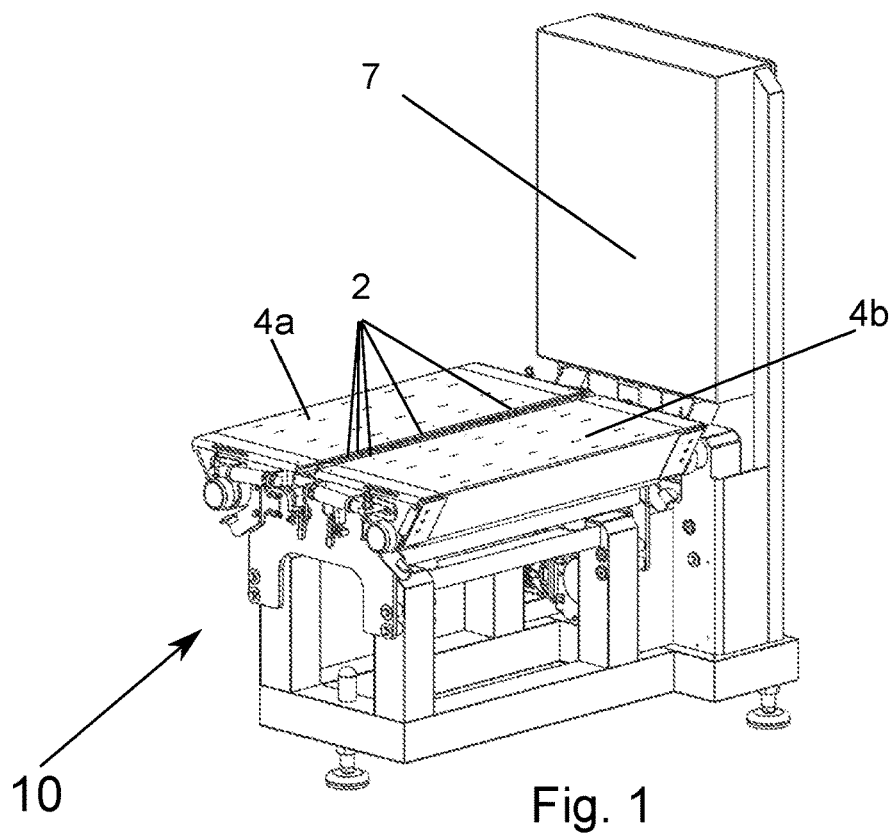
FIG. 1 shows an isometric sectional view of the weighing apparatus.

FIG. 1 depicts an embodiment of the inventive weighing apparatus 10 in an isometric view. The weighing apparatus 10 comprises two transport strips 4a, 4b, which convey onward a dough strip that is lying on them, for example within a dough strip installation. The transport strips 4a, 4b comprise the same circulating direction and transport a dough strip, lying on the transport strips 4a, 4b, along the longitudinal direction of the dough strip. In addition, the weighing apparatus 10 comprises 24 weighing cells 2, which are disposed at a distance from one another with respect to the width of the conveyor belts 4a, 4b or of the dough strips. The weighing cells 2 are distributed uniformly over the width or vertical or perpendicular to the running direction of the conveyor belts 4a, 4b and are disposed flush alongside one another. The weighing cells 2 extend beyond the plane of the two transport strips 4a, 4b and are each impacted by the weight of individual partial portions of the dough strip. The weighing cells 2 thus measure the weight of the respective dough piece of the dough strip and convey the recorded measuring values onward to an evaluation unit 7. Each weighing cell 2 thus measures the weight of a defined partial piece of the dough strip. By means of the evaluation unit 7, the mass of the partial pieces or the modification in mass of the partial pieces is then determined, taking into account the measuring values recorded by the weighing cells 2, and, for example, the masses of the partial pieces are compared with one another and/or a model of the dough strip is provided on the basis of the mass distribution over the width of the dough strip.

Figure 2:
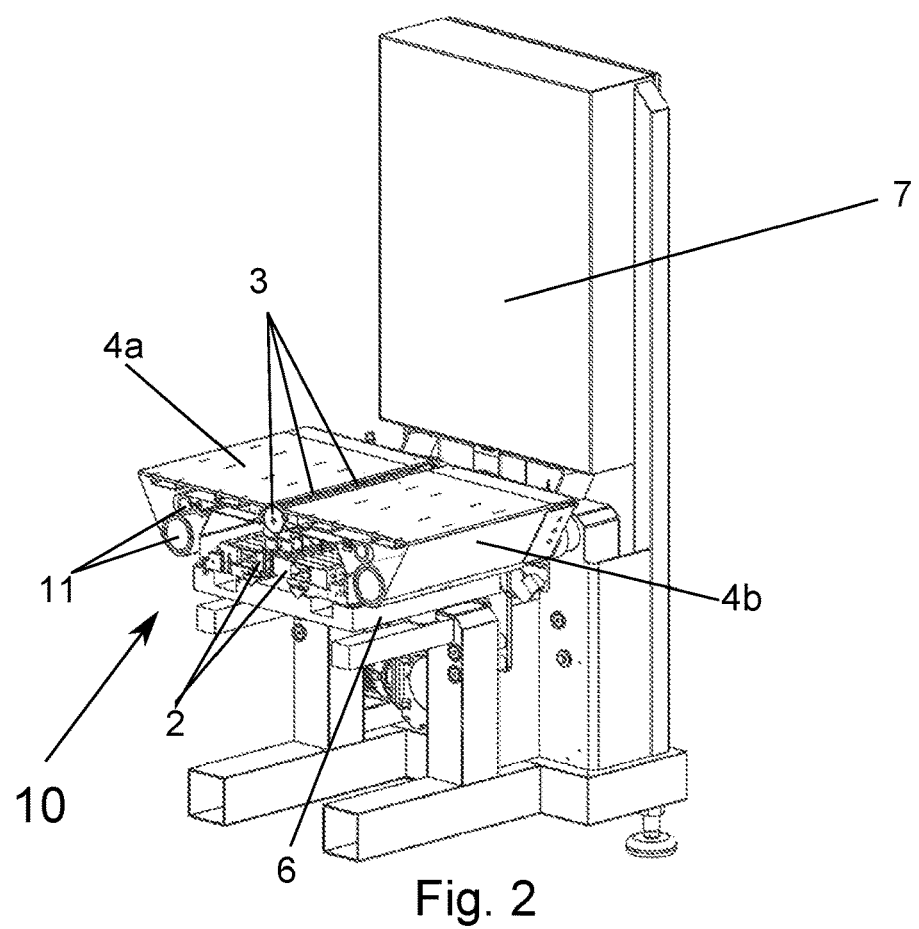
FIG. 2 shows a sectional view of an additional embodiment of the weighing apparatus.

FIG. 2 depicts an additional embodiment of the inventive weighing apparatus 10 in a sectional view. The section runs vertically through the transport plane of the transport strips 4a, 4b and in the longitudinal direction of a dough strip that is laid on the transport strips 4a, 4b and moved by the transport strips 4a, 4b in its longitudinal direction. The weighing apparatus 10 comprises two transport strips 4a, 4b, which are each fed by guide rollers 11, clockwise in this view, in closed rotation. The weighing apparatus 10 further comprises a number of weighing cells 2.

Figure 3:
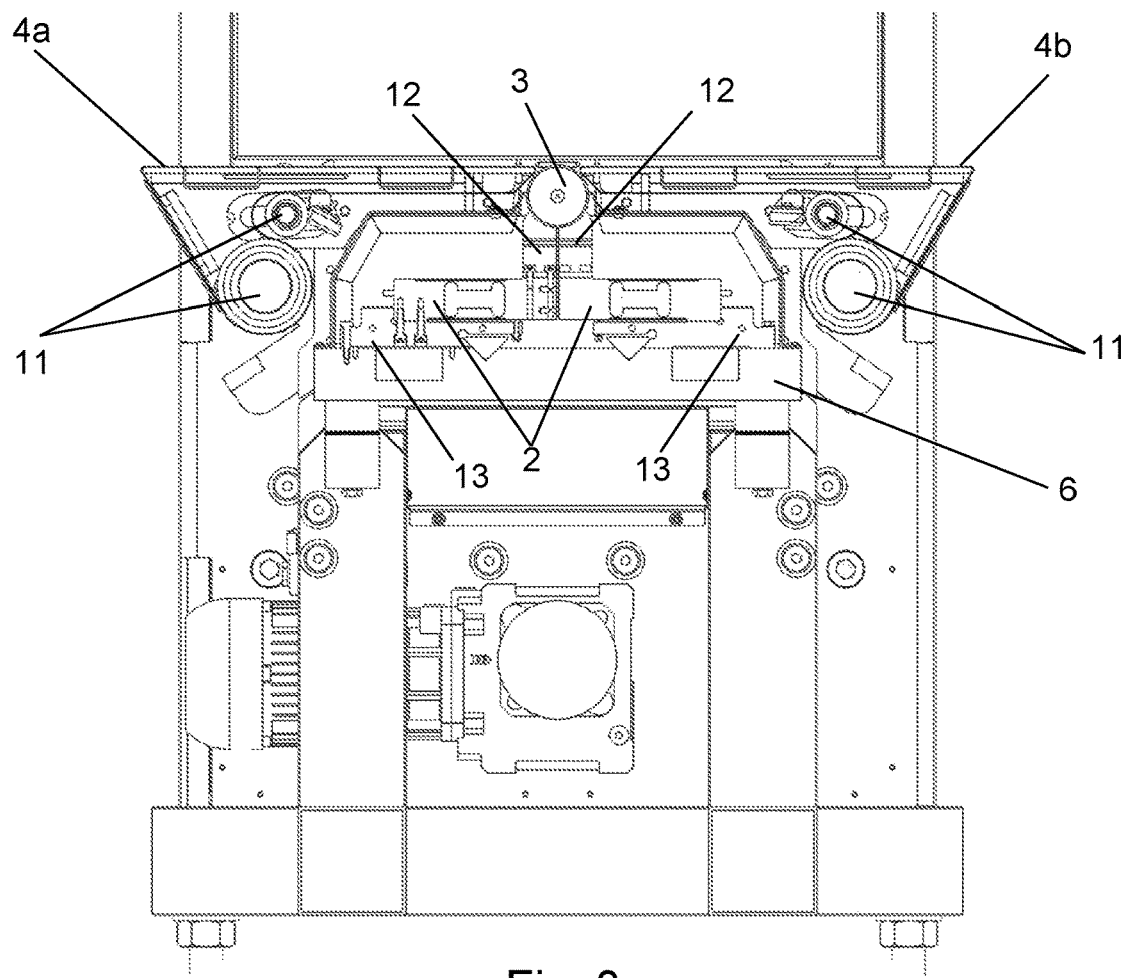
FIG. 3 shows a lateral view of the weighing apparatus in accordance with FIG. 2 in a section.
Figures 4, 5:
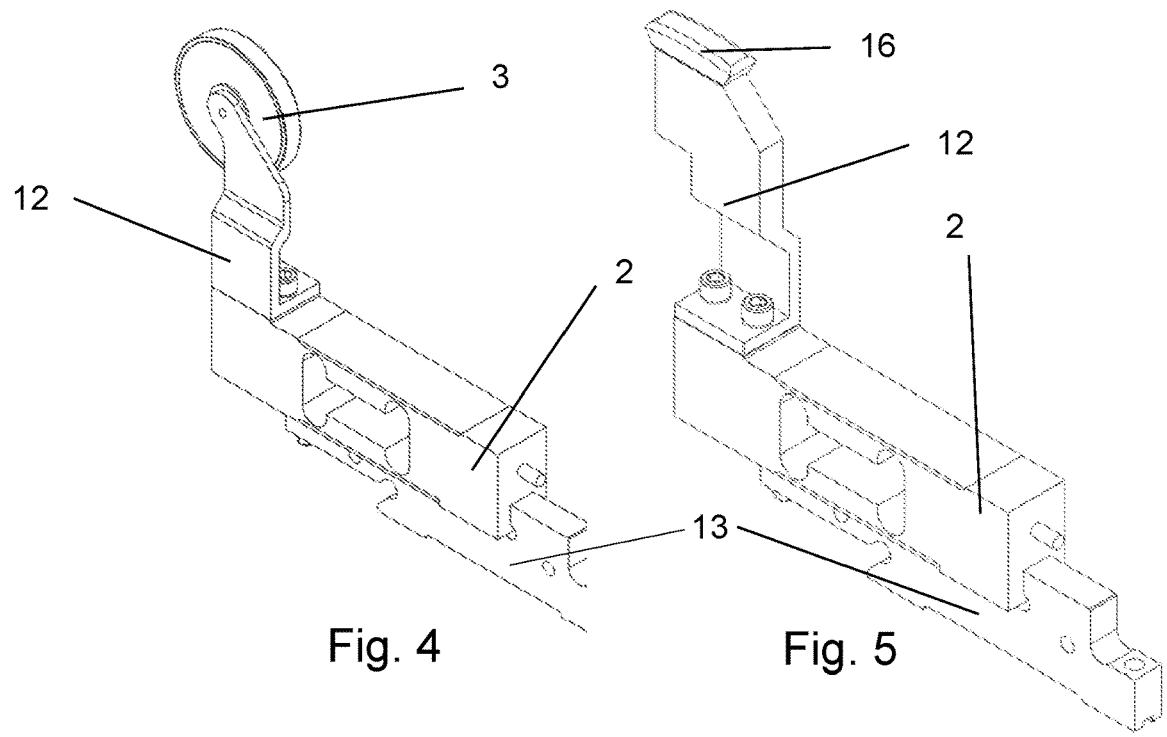
FIG. 4 shows a detail view of an embodiment of the weighing cell.
FIG. 5 shows an alternative embodiment of the weighing cell with glide shoes.

FIG. 4 shows a detail view of a weighing cell 2 used in the embodiment in FIG. 2 and FIG. 3. The weighing cell 2 is configured as a bending arm weighing cell and comprises in each case an oblong shape. The weighing cell 2 is connected on one side with the axles of a transport roller 3 by a roll holder 12. The weighing cell 2 is screwed together with a connecting piece 13 onto the end of the weighing cell 2 opposite the roll holder 12.

FIG. 3 shows a side view of the embodiment of the inventive weighing apparatus 10 depicted in FIG. 2, with the same section profile as in FIG. 2. The weighing apparatus 10 comprises two transport strips 4a, 4b, which are disposed in succession in the transport direction of the dough strip. The weighing cells 2 or the transport rolls 3 are disposed in the running direction of the two transport strips 4a, 4b and between them. When a dough strip lying on the transport strips 4a, 4b is handed over from the transport strip 4a to the other transport strip 4b, the transport rolls 3 and thus the weighing cells 2 are impacted by the weight of the dough strip. The respective weighing cell 2 is thus impacted with the weight of a partial piece of the dough strip. When the transport rolls 3 or the weighing cells 2 are at equal distances from one another, each weighing cell 2 is impacted with the weight of an equally large partial piece of the dough strip. Thus, in each case the width of the partial pieces corresponds to the distance of the weighing cells 2 or transport rolls 3 from one another. For example, if the dough strip is 800 mm wide and if a set of 60 transport rolls 3 is evenly distributed along the width of the transport strips 4a, 4b, then each partial piece weighing on the weighing cells 2 is approximately 13 mm wide if the width of the transport strips 4a, 4b corresponds to the width of the dough strip. To achieve a different width of each measured partial piece, the transport rolls 3 or the weighing cells 2 can also be disposed at a different distance as required. By selecting the appropriate distance between the weighing cells 2, the weight of partial pieces with defined width is always available for the evaluation.

As shown in FIG. 2 and FIG. 3, the weighing cells 2 are screwed with the connecting piece 13 to a frame 6 of the apparatus 10. The transport rolls 3 extend beyond the plane of the transport strips 4a, 4b. By means of a dough strip moved along its longitudinal direction by means of the transport strips 4a, 4b, the transport rolls 3 are each impacted with the weight of a partial piece, while the dough strip is moved over the transport rolls 3 by the transport strips 4a, 4b. Because of the weight of the partial pieces acting on the transport rolls 3 and thus on the weighing cells 2, the transport rolls 3 are impacted onto the surface of the dough strip. This weight impact is then recorded by the weighing cells 2, for example by measuring a minimal displacement of the end of the respective weighing cell 2 that is connected with the transport roll 3. Respective neighboring weighing cells 2 are disposed in rotation on the frame 6 of the apparatus 10, so that the transport rolls 3 connected with the respective weighing cells 2 are disposed flush alongside one another, but the ends by which the weighing cells 2 are connected with the connecting pieces 13 are each set apart or rotated by 180 degrees or point away from one another. This results in a compact structure, and closer distances can be realized between the transport rolls 3, or smaller partial pieces of a dough strip laid on the transport strips 4a, 4b are measured and the precision or resolution of the measured mass distribution is increased.

Alternatively, it is also possible to foresee 32, 16 or any other number of weighing cells. The weighing cells 2, alternatively, can also be configured, for example, as shear force weighing cells, shear beam weighing cells or traction weighing cells or as other weighing cells or power receptors known from the prior art.

The weighing cells 2 or the transport rolls 3, as depicted in FIG. 2 and FIG. 3, can be distributed uniformly over the width of the transport strips 4a, 4b or can be placed at varying distances from one another. Alternatively, it is also possible to foresee only one transport strip 4 or else no transport strip at all if the weighing apparatus 10 is disposed, for example, between two processing stations with their own transport strips in their transfer area.

Alternatively, the weighing cell 2, as depicted in FIG. 5, can also be connected with a rigid or movable glide layer 16 or other appropriate transmission elements by way of a connecting piece or else directly.

An inventive advantageous method for recording the weight of the partial pieces or the mass distribution along the width of a dough strip is described as follows:

In order to record the mass distribution along the width of a dough strip, the dough strip according to the present teaching is moved along its longitudinal direction, that is, along the continuous length of the dough strip. The dough strip has a specified reference width imprinted by roller or other form apparatuses. The weight of several defined partial pieces of the strip, with defined width and length, corresponding to the number of weighing cells 2 can be recorded by means of at least two weighing cells 2 with varying arrangement over the width of the dough strip, as shown for example in the embodiments of FIG. 1 through FIG. 3.

The mass of the partial pieces of the dough strip can be ascertained, taking into account the distance of the weighing cells 2 from one another, the position of the weighing cells 2 with respect to the dough strip, the strip speed and the measuring values of the weight of the partial pieces over a defined time segment as recorded by the weighing cells 2.

Thus, for example, the mass distribution of a dough strip with a width of 600 mm is measured by means of 60 weighing cells 2, in that the measuring values recorded by the weighing cells 2 with respect to one another are compared for the same point in time. Each partial piece of the dough strip measured by the weighing cells 2 is thus 10 mm wide. The mass distribution along the width of the dough strip can be measured by an evaluation unit 7 by imaging the weight of the partial pieces corresponding to their arrangement over the width of the dough strip or comparing the individual recorded mass values of the weighing cells 2. The recorded mass of the partial pieces can then be compared with a reference value or with the mass of the other partial pieces, and thus irregularities in the mass distribution along the width of the entire dough strip can be recorded.

In addition the measuring values, for example, of the weighing cells 3 can be integrated over a defined time segment, and thus mass modifications along the width and/or the length of the dough strip and/or deviations in the production process of the dough strip can be ascertained.

In addition, the mass flow of a dough strip transported by the weighing cells 2 or of several dough strips or dough strands fed parallel in each case over part of the weighing cells 2 can be determined. For this purpose a mass flow is calculated by integrating the measuring values received from the weighing cells 2 by means of the strip speed of the dough strip moved over the weighing cells 2 and of the masses running over the weighing cells 2.

Use of the inventive method and of the inventive apparatus foresees that they are disposed or used within a dough strip installation. Thus the weighing apparatus, for example a cutting unit, for example a longitudinal cutting unit, can follow within the dough strip installation, which cuts the dough strip into partial strips with equal mass per meter of length or pieces with the same mass. The cutting width of the cutting unit can be specified by the reported mass distribution of the strip, so that the continuous partial strips cut by the cutting apparatus along the longitudinal direction of the strip comprise equal mass per centimeter of length of the partial strip. Dough pieces or partial strips with equal mass can always be generated, independently of time, by displacement of the cutting apparatus by means of the transport speed and the mass distribution of the dough strip recorded over time as well as the arrangement of the cutting apparatus with respect to the weighing apparatus 10. As a result, by anticipating the steps of the cutting apparatus in advance, production can be always free of rejects, and precise by weight. For example, in the event that a dough area is too heavy to be cut, the cutting width for this area can be reduced and thus the weight adjusted. Because this can have impacts on the cutting width of neighboring partial pieces, the cutting width of the other partial pieces can advantageously be adjusted corresponding to the adjustment of the width of a partial piece. Alternatively, as a further measure, the longitudinal cut of the dough strip or dough strips can also be adjusted.

An additional use foresees that one or more adjustable rollers are placed behind the weighing apparatus 10 within a dough strip installation. Adjustment of the rollers can thus be modified by a control unit, taking into account the reported weight distribution along the width of the strip.

Continuous errors, for example, at one or more points in the dough strip can be observed by recording the mass distribution of the dough strip. As a countermeasure, a one-sided thickness adjustment or slanting of the rollers can be specified in a dough strip installation with adjustable roller works in order to counteract a thickness variation or the deviation in mass distribution of the dough strip or of single partial pieces of the dough strip. For example, if the right-hand dough strip side tends to be of greater weight than the left-hand dough strip side, this can be corrected by a deliberate slanting of the movable calibrating roller or other rollers. Likewise, alternatively, in using several movable calibrating roller works in sequence, the correction can be performed in stepwise refinements and thus the dough strip can be shaped even more uniformly.

Depending on the arrangement of the weighing apparatus 10, in the placement before a roller works, even with deviation in mass distribution, an advance correction in the roller works can occur by adjusting the rotation count or by gap adjustment, and thus the deviations can be corrected even within the production, for example before the cutting or continued processing. Advantageously, in addition, the dough pressure in the roller area can be measured at one or more points and the roller works or dough strip installation can comprise corresponding measurement gauges and the dough pressure can be taken into account in the regulation.

In addition, in using the weighing apparatus 10 within a dough strip installation, the weighing apparatus 10 can be disposed after a longitudinal cutting unit to reveal, depending on the impact of the weighing cells 2, how many dough pieces or dough strands have been cut, thus making an automatic series recognition possible.

As shown in the described embodiments, a single dough strip, which extends along the entire width of the weighing apparatus 10 and impacts all weighing cells 2 or a defined number of weighing cells 2, can be measured and the mass distribution or mass flow of this dough strip can be recorded. Alternatively, moreover, several dough strips or dough strands can be fed parallel over the weighing cells 2 or in each case over a part of the weighing cells 2, and thus deviations between dough strands or the mass flow of the dough strips or dough strands can be recorded.

Alternatively or in addition to the aforementioned uses, the weighing apparatus 10 can be used to determine the cutting length within the length of the dough strip. Thus, for example, in a transverse cutting unit with movable blades or in a cutting robot, the cutting length can be modified on the basis of the mass distribution.

In addition, it is foreseen that with the strip speed of the dough strip moved over the weighing cells 2, and the masses of the mass flow of dough running over the weighing cells 2, the mass flow of the dough through the weighing apparatus or within the dough strip installation is determined by integration of the measuring values received from the weighing cells 2. Depending on the mass flow, the transport speed of the transport strips 4 or the revolving speed of calibrating rollers can be adjusted and thus a targeted mass flow can be generated after the weighing apparatus 10. In addition, the mass distribution along the width of the dough strip can be adjusted or modified by compressing the dough strip and/or modifying the strip speed after the weighing apparatus.

In addition, analogously to the continuous partial pieces, single dough pieces with defined width and length can also be fed to the apparatus and the mass distribution or the mass of these dough pieces can be reported.

It is possible, as well, to use the strip weighing apparatus as a basis for the adjustment and regulation of the rollers.

An additional advantageous application of the weighing apparatus 10 foresees that the weighing cells 2 and/or the transport rollers 3 or the glide layers 16 connected with the weighing cells 2 extend beyond the transport plane of the dough strip, for example beyond the imaginary plane of the two transport strips 4a, 4b. The dough strip is then fed over a specified area by the weighing cells 2 and/or transport rollers 3 and/or glide layers 16 in such a way that the dough strip at least partly surrounds the weighing cells 2 and/or the transport rollers 3 and/or the glide layers 16. Then the tension of the dough strip can be ascertained on the basis of the modification of the measured measuring values of the weighing cells 2. Thus, for example, the dough strip can be fed over a fourth of the circumference of the transport rollers 3 and the tension of the dough strip can be recorded on the basis of the modification of the sag between the transport roller 3 and the next transport strip 4 and the associated modification of the mass measured by the weighing cells 2 by comparison with a reference model.

Alternatively, instead of the dough strip, other strips such as fabric, paper or steel strips can be inserted into the apparatus and the illustrated weighing apparatus 10 can be adjusted to the requirements of these strips. Likewise, the inventive method can also be used for such strips.

To calibrate the weighing cells 2 or the weighing apparatus 10, a defined calibrating strip can be conveyed by them and the resulting measuring values can be applied to adjust the weighing cells 2 and the evaluation unit 7.

What is claimed is:

1. A method for measuring the mass distribution along the width of a strip that moves along its longitudinal direction, in particular a dough strip, with specifiable reference width,
    wherein by at least two weighing cells, which are disposed at a distance from one another based on the width of the strip, the weight of at least one dough strand or dough piece is recorded with a width defined by the distances of the weighing cells,
    wherein the mass of the partial pieces of the strip is ascertained while taking into account the distance of the weighing cells from one another, the position of the weighing cells along the width of the strip, the strip speed and the mass values of the weight of the partial pieces recorded by the weighing cells, in particular over a defined time segment,
    wherein transport rollers or glide layers connected with the weighing cells extend beyond the transport plane of the strip, in particular a dough strip, wherein the strip, in particular the dough strip, in a specified area is fed over the transport rollers or glide layers in such a way that the strip, in particular the dough strip, at least partly surrounds the transport rollers or glide layers and wherein the tension within the strip, in particular the dough strip, is ascertained on the basis of the modification of the measured values of the weighing cells.

2. The method according to claim 1, wherein the measuring values of the weighing cells are integrated over a defined time segment and/or that a mass flow is determined, in particular through integration of the measuring values received from the weighing cells, on the basis of the strip speed of the strip moved over the weighing cells and the masses running over the weighing cells.

3. The method according to claim 1, wherein the respective measured mass of partial pieces is compared among themselves or with a reference value, thus ascertaining deviations in weight of the partial pieces with respect to one another or to a reference value along the width of the strip.

4. The method according to claim 1, wherein, on the basis of the recorded measuring values and/or mass of the partial pieces
    the cutting width of a cutting unit, in particular a cutting unit following the weighing cells, in particular a longitudinal cutting unit, is specified in such a way that the continuous dough strips cut by the cutting apparatus along the cutting direction of the strip include equal mass per longitudinal unit of the dough strip and/or
    the position of rollers, in particular those following the weighing cells, to which the strip, in particular the dough strip, is fed, is modified.

5. The method according to claim 1, wherein, on the basis of the recorded measuring values and/or mass of the partial pieces and on the basis of the strip speed of the strip moved over the weighing cells and of the masses running over the weighing cells, a mass flow, in particular through integration of the measuring values received from the weighing cells, is determined and that by modifying the transport speed of transport strips or the rotating speed of calibrating rollers, in particular within one dough strip installation, the mass flow is adjusted or modified after the weighing apparatus by compressing the strip and/or modifying the strip speed.

6. A weighing apparatus for measuring the mass distribution along the width of a strip, in particular a dough strip, moved in its longitudinal direction, with specified reference width, in particular according to a method of claim 1, including at least one transport strip to transport the strip, in particular the dough strip, along its longitudinal direction, wherein the weighing apparatus includes at least two weighing cells,
    wherein the weighing cells are each configured to determine the weight of a partial piece of a strip, in particular a dough strip, lying on the transport strip, wherein the weighing cells are disposed at a distance from one another with reference to the width of the strip, and
    wherein the weighing apparatus includes an evaluation unit, with which the mass distribution in the strip, in particular the dough strip, can be ascertained, taking into account the measuring values recorded by the weighing cells,
    wherein the weighing cells are connected with transport rollers, preferably with the axles thereof, and/or with glide layers in such a way that a strip moved by the transport strip along its longitudinal direction is mounted on the transport rollers and/or glide layers and can be moved away and these are impacted with a defined part of the weight of the dough strip,
    wherein the weighing apparatus includes two transport strips, which are disposed in sequence in the transport direction of the strip, wherein the weighing cells, in particular the transport rollers and/or glide layers are disposed between the two transport strips in such a way that upon transmission of one strip lying on the transport strips from one transport strip to the other transport strip, the weighing cells, in particular the transport rollers and/or glide layers, are impacted by the weight of the strip, wherein each weighing cell is impacted by the weight of one partial piece of the strip.

7. The weighing apparatus according to claim 6, wherein the weighing cells are disposed in transverse direction, in particular in the end portion, to the running direction of the transport strip, in particular flush alongside one another.

8. The weighing apparatus according to claim 6, wherein the weighing cells are configured as shear force weighing cells, bending arm weighing cells, shear beam weighing cells or traction weighing cells.

9. The weighing apparatus according to claim 6, wherein the weighing cells are each connected on one side to a frame of the weighing apparatus, and in particular in each case the opposite side of the weighing cell is connected with the transport rollers and/or glide layers in such a way that the weight of a partial piece of the strip is ascertained by the respective weighing cells during transport of a strip over the transport rollers and/or glide layers.

10. The weighing apparatus according to claim 6, wherein the weighing apparatus includes 16 weighing cells, wherein in particular the weighing cells are disposed at uniform distances along the width of the transport strip, in particular over a total distance of 800 mm.

11. A dough strip installation including a weighing apparatus according to claim 6, wherein a cutting installation, in particular a longitudinal cutting unit, and/or one or more movable rollers are placed after the weighing apparatus, wherein the dough strip installation or the weighing apparatus includes a control unit with which the cutting width of the cutting unit, in particular a longitudinal cutting unit, is specified, taking into account the ascertained weight distribution along the width of the strip, so that the continuous dough strips cut by the cutting device along the longitudinal direction of the strip include an equal mass per longitudinal unit of the partial strip and/or that the adjustment of the rollers by the control unit, taking into account the ascertained weight distribution along the width of the strip, can be modified and/or that at least one transport strip or at least one calibrating roller is placed before and/or after the weighing apparatus, wherein, on the basis of the mass flow ascertained by the weighing apparatus, the transport speed of the transport strip or the revolving speed of the calibrating roller, the mass flow can be adjusted or modified by compressing the dough strip and/or modifying the strip speed.

12. A weighing apparatus for measuring a mass distribution of a dough strip, comprising:

two transport strips in sequence for moving the dough strip in a transport direction;

a transport roller positioned between the two transport strips;

at least two weighing cells connected to the transport roller and at a distance from one another based on a width of the dough strip;

such that when the dough strip is moved over the transport roller each of the at least two weighing cells is impacted by a weight of a partial piece of the dough strip;

an evaluation unit ascertains the mass distribution of the dough strip, taking into account values measured by the at least two weighing cells and the distance from one another.

13. The weighing apparatus of claim 12, wherein the at least two weighing cells are connected on one side to a frame, and on an opposite side connected with the transport roller.

14. The weighing apparatus of claim 12, wherein the mass distribution is ascertained taking into account positions of the at least two weighing cells along the width of the dough strip and a speed of the dough strip.

15. The weighing apparatus of claim 12, wherein the transport roller comprises a plurality of transport rollers, each connected to at least two weighing cells.

16. A dough strip installation, comprising:
the weighing apparatus of claim 12;
a cutting unit;
a control unit controlling the cutting unit using the measured mass distribution;
such that the dough strip is cut by the cutting unit along a longitudinal direction in an equal mass per longitudinal unit of a partial dough strip.

17. The dough strip installation of claim 16, wherein the mass distribution is adjusted by modifying a speed of the dough strip.

18. The dough strip installation of claim 16, further comprising a calibrating roller, wherein the mass distribution is adjusted by compressing the dough strip with the calibrating roller.

* * * * *